United States Patent [19]

Abeywardena et al.

[11] Patent Number: 5,155,163
[45] Date of Patent: Oct. 13, 1992

[54] AQUEOUS POLYURETHANE DISPERSION SYNTHESIS FOR ADHESIVE THERMOFORMING APPLICATIONS

[75] Inventors: Palitha K. Abeywardena, Mishawaka; Pak T. Leung, Granger, both of Ind.

[73] Assignee: Uniroyal Adhesives and Sealants, Inc., Mishawaka, Ind.

[21] Appl. No.: 563,235

[22] Filed: Aug. 6, 1990

[51] Int. Cl.⁵ .............................................. C08L 75/06
[52] U.S. Cl. ..................................... 524/591; 524/839; 524/840; 156/331.4; 156/331.7; 427/385.5; 427/393.5
[58] Field of Search ...................... 524/591, 839, 840; 156/331.4, 331.7; 427/385.5, 393.5

[56] References Cited

U.S. PATENT DOCUMENTS

| | | | |
|---|---|---|---|
| 3,479,310 | 11/1969 | Dietrich et al. | 260/29.2 |
| 3,870,684 | 3/1975 | Witt et al. | 260/75 |
| 4,036,801 | 7/1977 | Matsuda et al. | 260/29.2 |
| 4,240,942 | 12/1980 | Wenzel et al. | 260/29.2 |
| 4,307,004 | 12/1981 | Schuhmacher et al. | 260/29.2 |
| 4,310,373 | 1/1982 | Schuhmacher et al. | 156/308.2 |
| 4,408,008 | 10/1983 | Markusch | 524/591 |
| 4,558,090 | 12/1985 | Drexler et al. | 524/591 |
| 4,762,880 | 8/1988 | Leung | 524/853 |

FOREIGN PATENT DOCUMENTS

| | | |
|---|---|---|
| 0220000 | 4/1987 | European Pat. Off. ............ 524/840 |
| 1078202 | 8/1967 | United Kingdom . |
| 1191260 | 5/1970 | United Kingdom . |
| 1193732 | 6/1970 | United Kingdom . |
| 1462597 | 1/1977 | United Kingdom . |
| 1601033 | 10/1981 | United Kingdom . |

OTHER PUBLICATIONS

Leung and Chmile, Laminating Expandable vinyl for Auto Thermoforming Uses, Adhesives Age (1989).

Primary Examiner—Maurice J. Welsh
Assistant Examiner—Rachel Johnson
Attorney, Agent, or Firm—Pennie & Edmonds

[57] ABSTRACT

This invention relates to a process for preparing water dispersible polyurethane compositions. More specifically, this invention relates to a process for the preparation of self-emulsifying polyurethanes that form stable, homogeneous emulsions with water. The present invention also relates to the polyurethane compositions obtainable by this process, their dispersions in water, and to their use as adhesives in thermoforming applications.

37 Claims, No Drawings

AQUEOUS POLYURETHANE DISPERSION SYNTHESIS FOR ADHESIVE THERMOFORMING APPLICATIONS

FIELD OF INVENTION

This invention relates to a process for preparing aqueous polyurethane dispersions or emulsions. More specifically, this invention relates to a process for the preparation of self-dispersing polyurethanes that form stable, homogeneous dispersions with water. The present invention also relates to the dispersions obtainable by this process and to their use for adhesive thermoforming applications.

BACKGROUND OF THE INVENTION

One approach to the preparation of an aqueous-dispersible polyurethane composition, is to dissolve a polyurethane in solvent and then convert the polymer solution into a dispersion by adding the solution with agitation into water containing an emulsifier. This procedure generally suffers from several disadvantages, one of which is the use of large amounts of solvents to dissolve the polyurethane, which solvent then has to be removed. Also, the dispersions obtained by this method can be relatively unstable, and the emulsifier cannot be removed from the polymer film, these problems leading to undesirable film properties.

Another method is to synthesize the polyurethane dispersions with emulsifiers which are chemically incorporated into the polymer backbone, such as disclosed in U.S. Pat. No. 3,479,310 to Dieterich et al. Aqueous polyurethane dispersions free of emulsifiers are prepared from a polyurethane with salt-type groups incorporated into the polymer backbone. These ionic groups exert an emulsifying effect that enables an aqueous dispersion to be produced without the addition of emulsifiers or other substances which assist in the dispersion or emulsification process.

Polyurethanes containing such ionic groups can be prepared by reacting organic polyisocyanates with compounds containing at least two active hydrogen atoms in a molecule which contains at least one salt-type group or a group that is capable of salt formation. The polyurethane dispersion is preferably prepared in a suitable inert organic solvent and is dispersed in water. The properties of the polyurethane dispersions depend on the ratio of isocyanate groups to active hydrogen atoms. The term "active hydrogen atoms" refers to hydrogen atoms which, because of their position in the molecule, display activity according to Zerewitinoff test (J. Amer. Chem. Soc. 49, 3181 (1927). These include hydrogen atoms attached to O, S and/or N as in the groups —OH, —SH, =NH, —NH$_2$ and the like.

If the isocyanate groups are in equivalence or below the equivalent amount of the active hydrogen atoms, no further chemical reaction takes place during the conversion into an aqueous dispersion. If the isocyanate groups are in excess, however, they will react with water and give rise to lumpy or curdled dispersions. Chain extenders that are soluble in water and are highly reactive towards isocyanate groups can be used in an attempt to control the reaction, as well as to obtain high molecular weight polyurethanes.

There remains a need, however, for emulsifier-free polyurethane dispersions, particularly for use in adhesive formulations. The present invention provides novel, aqueous polyurethanes which do not require emulsifiers to form stable dispersions.

SUMMARY OF THE INVENTION

The invention relates to aqueous polyurethane dispersions to be used as adhesives, especially for use in thermoforming applications, and to a process for preparing such stable polyurethane dispersions.

The invention also discloses how to prepare emulsifier-free polyurethane dispersions that contain one chain extender having an ionic group that will form the self-emulsifying part of the polyurethane structure and additional chain extenders that will impart specific properties to the polymer and increase the molecular weight of the polyurethane. These dispersions are stable and homogeneous, and contain polyurethane resins having excellent physical, chemical and dispersion or emulsion properties.

The polyurethane dispersions obtained in accordance with the present invention are so-called self-dispersible emulsions, which do not contain an emulsifier. However, known emulsifiers may also be added to the dispersion of the present invention in order to further improve the stability of the dispersions, provided that the amount of the emulsifier used does not detrimentally affect the properties of the polyurethane polymer or the adhesive properties of the dispersion.

The present invention also discloses the use of the synthesized aqueous polyurethane dispersions, by themselves or with other reacting and/or non-reacting chemical additives, for adhesive applications. Specifically, the invention is intended for use in applications using thermoforming techniques, such as those disclosed in U.S. Pats. 4,762,880 and 4,853,061, and to provide polymers which possess a wide range of properties including high temperature resistance, high humidity resistance, hardness, elasticity, flexibility, tensile strength and the like.

DETAILED DESCRIPTION OF THE INVENTION

According to the present invention, the following compounds or a combination of these compounds, are used in the synthesis of stable polyurethane dispersions.

1) an organic isocyanate compound, preferably a polyisocyanate;

2) an organic compound containing at least two active hydrogens and at least one ionized or easily ionizable group;

3) a first polyol, preferably of an oligomeric or polymeric polyol which exhibits a degree of crystallinity and a melting point or melting temperature range;

4) a first extender for increasing the molecular weight of the polyurethane;

5) a second extender for optionally forming a prepolymer with the organic isocyanate compound; and 6) a base for neutralizing or removing the ionized or easily ionizable group of the organic compound.

The preferred organic (aromatic, aliphatic or cycloaliphatic) isocyanate compounds are polyisocyanates containing at least two isocyanate groups. Suitable diisocyanates which may be employed in this invention include aromatic, aliphatic or cycloaliphatic diisocyanates, such as 4,4'-diphenylmethane diisocyanate (MDI), 2,4- and 2,6- toluene diisocyanate (TDI), ditolyl diisocyanate (TODI), 1,5-naphthalene diisocyanate, 4,4'- dibenzal diisocyanate, m- or p-xylene diisocyanate, 1,3- phenylene diisocyanate, 1,6-hexamethylene diisocyanate, isophorone diisocyanate, 1,4-cyclohexane diisocyanate and the like.

The compound having at least two active hydrogens and at least one ionized or easily ionizable group preferably includes diamine or diol compounds containing carboxylic groups capable of salt formation. These organic compounds contain at least two amine or hydroxyl groups, and at least one comparatively unreactive carboxylic group at a lateral or terminal position, either in the salt form or in a form capable of salt formation by neutralizing with a suitable base or a salt generating agent. Suitable carboxylic containing compounds are preferably an alpha, alpha dimethylol C2-C10 alkanoic acid such as 2,2-dimethylol propionic acid.

The first polyol may be any of a wide variety of oligomeric or polymeric polyols, with polyester or caprolactone based polyols containing at least two hydroxyl groups being preferred. These polyols should be crystalline with a crystalline melting point or melting range of 30° C to 100° C, and preferably 40° C to 70° C. The polyol may have a slow or fast crystallization rate, but moderate to fast crystalline rates are preferred.

Suitable first polyols used in this process include those are predominantly linear having a molecular weight in the range of 300 to 5,000 and, preferably 1,000 to 2,000. These may include for example, polyesters, polyethers, polyesteramides, polyacetals, polythioethers, polyacetones and the like. Dihydroxy polyesters are those obtained from the reaction of dicarboxylic acids as single species or mixes (such as, succinic acid, adipic acid, suberic acid, azelaic acid, sebacic acid, phthalic acid. isophthalic acid, tetraphthalic acid, tetrahydrophthalic acid and the like) with diols (such as ethylene glycol, 1,2- and 1,3- propylene glycol, diethylene glycol, 1,4- and 1,3- butanediol, 1,6- hexanediol, 1,8-octanediol, neopentyl glycol, 1,3- (2- methyl) propyldiol, and the like) as single species or mixes. A particularly preferred compound is a hexane diol-mixed acid polyester diol known as S-1019 which is available from Ruco Chemicals. Another preferred compound is a caprolactone based polyester diol known as Tone 240, which is available from Union Carbide.

A first chain extender, E(Y), is added to the emulsion to extend the polyurethane to obtain a high molecular weight polyurethane resin dispersion. This extender is a water soluble, low molecular weight compound with active hydrogen atoms, such as a diamine, because amines react with isocyanates much more rapidly than water. The diamine may be a linear chain or branched chain diamine. The use of branched chain diamines has a distinct melting point lowering effect. The amount of diamine added to the reaction may be the stoichiometric amount based on the free isocyanate groups present, or a stoichiometrically deficient amount of diamine may also be used. Extender E(Y) may also contain other compounds such as monofunctional or multifunctional low molecular weight, water soluble organic compounds. Aminocarboxylic acids or aminosulphonic acids can be used as monofunctional compounds, and multifunctional triamine compounds or hydroxylamine compounds can also be used.

Suitable E(Y) extenders are linear or branched compounds containing active hydrogen atoms, preferably primary or secondary amine groups and more preferably, diamine compounds with primary amine groups at the end of the molecule. These compounds may be aliphatic, aromatic or cycloaliphatic diamines. Examples are: hexamethylene diamine, 2-methyl pentamethylenediamine, 1,4- diaminocyclohexane, bis (3-aminopropyl)piperazine and the like. Examples of aminocarboxylic acid compounds are: 11-aminoundecanoic acid, 6-aminocaproic acid, 4-aminobutyric acid and the like. Compounds containing multifunctional groups, such as diethanol amine, tri(aminopropyl) amine and the like can be used.

A second chain extender, E(Z), may be used to form an isocyanate prepolymer. This extender is an organic compound of low molecular weight and contains at least two active hydrogen atoms. These compounds react with the isocyanate groups and build up the molecular weight of the polyurethane as well as contribute to the physical properties of the polymer.

The phrase "low molecular weight" is intended to refer to the molecular weights of about 62 to about 500, preferably from about 90 to about 200. Linear molecules with an even number of carbon atoms in the chain can be used to improve the strength of the polyurethane, whereas diol molecules with side chains, ether groups or an odd number of carbon atoms can contribute to lowering of the melting point or the melting range of the polymer. Suitable E(Z) chain extenders include ethylene glycol, 1,4- butanediol, 1,6- hexanediol, neopentyl glycol, 2,2- dimethylhexane-1,3-diol, diethylene glycol, triethylene glycol, 1-3- propanediol, 1,5- pentanediol and the like.

The bases used in this invention to convert the carboxylic acid containing compounds to their respective salts by neutralizing the carboxylic acid groups, are either organic or inorganic bases. Suitable salt-generating compounds used in this invention are basic tertiary amines containing organic compound, which can neutralize the carboxylic groups. Examples are N- alkyldialkanolamines (e.g., N- methyl diethnolamine), N-N-dialkylalkanolamines (e.g., N,N- diethyl ethanolamine), trialkylamines (e.g., triethylamine) and the like.

Inert organic solvents, preferably those that can easily solubilize the reactants at a suitable high concentration and at the required reaction temperature may optionally be used in the formulations of this invention. The preferred organic solvent is a highly polar, high boiling solvent such as 1-methyl-2-pyrrolidinone. If a polar solvent with a low boiling point, or a mixture of such solvents are used in the synthesis, the solvent(s) can be removed by distillation from the final dispersion. Examples of such solvents are acetone, methyl ethyl ketone, etc.

Catalyst compounds for this invention include organotin compounds or tertiary amine compounds. The reactions for forming the prepolymer may be carried with or without a catalyst. The preferred catalyst compounds for the reaction are organotin compounds and more preferably dibutyltindilaurate is used.

The aqueous polyurethane dispersions described herein may be defined by the following general formula and preferred components:

$$(I-H)_a (I-P)_b (I-E(Y))_c (I-E\ Z\ )_d (B)_e$$

which can also be written as $$(I)_x (P)_b (E(Y))_c (E(Z))_d (B)_e$$

where $x = a + b + c + d$
where,
I - a polyisocyanate

H - a diamine or diol compound containing an ionized or easily ionizable unit capable of salt formation, such as a carboxyl group P - an oligomeric or polymeric polyol of molecular weight in the range 300 to 5,000, preferably a crystalline polymer having a molecular weight from 1,000 to 2,000

E(Y) - extender (Y), preferably a low molecular weight diamine

E(Z) - extender (Z), preferably a low molecular weight diol

B - a base, preferably a low molecular weight tertiary amine, wherein a,b,c,d and e are the molar ratios of the different components in the formula, with a being 10 to 30, b being 5 to 15, c being 1 to 10, d being 0 to 20 and e being 5 to 30.

The method of the preparation of the polyurethane dispersion of the present invention can be summarized as follows:

1) preparation of the prepolymer (diisocyanate, polyol solvent, dimethylol propionic acid and with and without catalyst)

2) chain extension of the prepolymer by extender E(Z), if desired 3) neutralization of the carboxylic groups with a suitable base compound 4) dispersion or emulsification of the prepolymer with hot or cold water 5) chain extension of the prepolymer by extender E(Y)

6) adjustment of percent solids and viscosity of the formulation as required

The isocyanate-terminated prepolymer is prepared by reacting the diisocyanate with the oligomeric or polymeric polyol, or a mixture of suitable polyols in a required ratio, and with the dihydroxy compound containing the carboxylic group, preferably, 2,2-dimethylol propionic acid, in an inert organic solvent, preferably, 1-methyl-2-pyrrolidinone. The total amount of the solvent used for the synthesis is in the range of 0 to 25% by weight of the polymer, preferably in the range of about 3 to 15%, more preferably in the range of about 5 to 12%. The amount of organic solvent used in the isocyanate-terminated prepolymer synthesis depends on the reactant concentration and the reaction temperature.

The reaction is carried out at a temperature range of about 20 to 150° C., over a time period of one half hour to four hours, depending on the reaction temperature and the reactivity of the reactants. Preferably, the reaction temperature is in the range 50 to 70° C., and the reaction time period is about 1 to 2 hours.

For the chain extension of the prepolymer, the low molecular weight chain extender E(Z), preferably a dihydroxy compound, can be added to the reaction either at the beginning of the reaction or towards the end of the reaction. Similarly, a dihydroxy organic compound containing a carboxylic group can be added to the prepolymer at a suitable time and temperature, either with or without a solvent.

To the prepolymer thus prepared, a low molecular weight base, preferably a tertiary amine compound, is added to neutralize, either partially or fully, the carboxylic acid groups in the backbone of the prepolymer. This base may be added to the reaction mixture in a temperature range of about 30 to 90° C., more preferably, in a temperature range of about 40 to 70° C. The carboxylate ionic groups formed impart self-emulsifying properties to the prepolymer. The amount of the ionic(salt)-type groups in the polymer chain is in the range of 10 to 100 milli-equivalents per 100 grams of the polymer, more preferably, in the range of 30 to 60 milli-equivalents per 100 grams of the polymer. Water is added to the prepolymer under vigorous stirring conditions to form a dispersion. The water temperature may be anywhere in the range of 20° C. to 100° C., more preferably, water at room temperature is used.

The final chain extension of the prepolymer to obtain the high molecular weight polyurethane, is done by using a water soluble, low molecular weight compound containing at least two active hydrogen atoms. The preferred E(Y) chain extender is a diamine compound that can be used in stoichiometric amounts or in stoichiometrically deficient amounts.

The polyurethane dispersion thus obtained may be diluted with water to obtain the required percent solid levels. The viscosity of the emulsion may be adjusted using a suitable thickener, that will give a stable viscosity if necessary, and one that will not interfere with the required dispersion, polymer and/or adhesive properties.

Dispersion and extension reactions can be carried out simultaneously by mixing the base used for the salt formation and the diamine (E(Y)) with the water and adding these materials to the prepolymer solution. When the diamine level is below the stoichiometric amount required to react with the free isocyantes, foaming can be observed during the dispersion/extension step as a result of the reaction of the free isocyanate with water. This can be overcome by adding a defoamer to the prepolymer solution before dispersion, or during or after the dispersion/extension process.

The aqueous polyurethane dispersions obtained have particle sizes in the range of 10 nm to 10 microns, preferably in the range of 0.05 to 1 micron, and more preferably in the range of 0.1 to 0.5 micron. The particle sizes may vary depending on the reaction and the reactor parameters. The molecular weight of the polymers are generally in the range 10,000 to 500,000 depending on the reaction parameters and the extension reaction. If multi-functional extenders are used in the final reaction, the polymer molecular weight may even be higher. The dried polymer films often exhibit melting and/or glass transition temperatures. The melting peaks may generally occur in the range of about 30 to 100° C., and the glass transition temperatures fall in the range of about $-50$ to $-10$ C.

The aqueous polyurethane dispersions obtained by the process described in this inversion can be up to about 60% solids and the emulsion viscosity can be up to about 10,000 cps or higher. These dispersions can be used directly, without other additives, for adhesive applications. Other chemicals can be added to the polyurethane dispersion to formulate for a particular application, for example, use of thickeners, fillers, pigments, wetting agents, defoamers and the like. In applications where high heat resistance and/or high humidity resistance is required, the polyurethane dispersion can be mixed with compounds that can react with the polymer to form a crosslinked (thermoset) polymer. These reactive compounds can be mixed with the dispersion before application. Reaction may occur in the polymer film during the drying process of the film or on application of heat to the polymer coating. Crosslinking of the polyurethane leads to better heat, humidity and chemical resistance.

The aqueous polyurethane dispersions discussed in this invention are prepared without the use of emulsifiers. If desired, emulsifiers can be added to the dispersion to further stabilize the dispersion against coagulation due to the addition of external compounds to the dispersion, or against external conditions. The emulsifiers chosen should be those which do not affect the polymer properties or the adhesive properties of the polymer.

EXAMPLES

The present invention will be further described with reference to the following "examples" in which "parts" and "%" are by weight unless specified otherwise. It should be understood that these examples are illustrative and are not limiting in any way.

EXAMPLES 1-3

These examples illustrate the synthesis method without the use of the optional extender E(Z).

Example 1

2.55 parts of dimethylol propionic acid, 38.06 parts of a caprolactone based diol (molecular weight 2,000), Union Carbide Tone 240, 0.097 parts of dibutyltindilaurate and 10 parts of 1-methyl-2-pyrrolidinone were charged into a flask equipped with a stirrer and a thermometer, under dry nitrogen cover. The temperature of the flask was maintained at about 60° C.

8.28 parts of an 80:20 mixture of 2,4- and 2,6- toluene diisocyanate (TDI) were added dropwise into the flask over a period of 5 to 10 minutes, while maintaining the reaction temperature at between 60 and 70° C., followed by the addition of 15 parts 1-methyl-2-pyrrolidinone. The reactants were stirred for one hour at about 60° C.

1.92 parts of triethylamine were added to the flask and the mixture was stirred for 10 minutes. 200 parts of deionized water which was heated to the reaction temperature (60° C.) were added to the flask to form the dispersion. 1.10 parts of 2-methyl pentamethylene diamine were added to the dispersion. The dispersion was stirred at 60° C. for about 2 hours.

A polyurethane dispersion of 18% solids was obtained.

Example 2:

4.57 parts of dimethylol propionic acid, 34.07 parts of a hexanediol-mixed acid polyester diol (molecular weight 2,000), Ruco Chemicals S-1019, 0.102 parts of dibutyltindilaurate and 10 parts of 1-methyl-2-pyrrolidinone were charged into a flask equipped with a stirrer and a thermometer, under dry nitrogen cover. The temperature of the flask was maintained at about 60° C.

10.38 parts of an 80:20 mixture of 2,4- and 2,6- toluene diisocyanate (TDI) were added dropwise into the flask over a period of 5 to 10 minutes, while maintaining the reaction temperature at between 60 and 70.C, followed by the addition of 15 parts 1-methyl-2-pyrrolidinone. The reactants were stirred for about ½ hour at about 60° C.

3.19 parts of triethylamine were added to the flask, followed by 125 parts of deionized water which was heated to the reaction temperature (60 C) to form the dispersion. 0.987 parts of 2-methyl pentamethylenediamine were added to the dispersion. The dispersion was stirred at 60° C. for about 2 hours.

A polyurethane dispersion of 25% solids was obtained.

Example 3:

4.35 parts of dimethylol propionic acid, 32.46 parts of a caprolactone based diol (molecular weight 2,000), Union Carbide Tone 240, 0.103 parts of dibutyltindilaurate and 10 parts of 1-methyl-2-pyrrolidinone were charged into a flask equipped with a stirrer and a thermometer, under dry nitrogen cover. The temperature of the flask was maintained at about 60° C.

11.31 parts of an 80:20 mixture of 2,4- and 2,6- toluene diisocyanate (TDI) were added dropwise into the flask over a period of 5 to 10 minutes, while maintaining the reaction temperature between 60 and 70.C, followed by the addition of 15 parts 1-methyl-2-pyrrolidinone. The reactants were stirred for about half-an-hour at about 60° C.

3.16 parts of triethylamine were added to the flask followed by 125 parts of deionized water which was heated to the reaction temperature (60.C) to form the dispersion. 1.883 parts of 2-methyl pentamethylenediamine were added to the dispersion. The dispersion was stirred at 60.C for about 2 hours.

Example 4:

This example illustrate the synthesis method with two polyols and without the use of the optional extender (E(Z)).

4.56 parts of dimethylol propionic acid, 8.52 parts of Caprolactone based diol, Union Carbide Tone 240, 25.55 parts of a hexanediol-mixed acid polyester diol, Ruco chemicals S-1019, (polyol molecular weights 2,000), 0.999 parts of dibutyltindilaurate and 10 parts of 1-methyl-2-pyrrolidinone were charged into a flask equipped with a stirrer and a thermometer, under dry nitrogen cover. The temperature of the flask was maintained at about 60° C.

10.38 parts of 80:20 mixture of 2,4- and 2,6- toluene diisocyanate (TDI) were added dropwise into the flask over a period of 5 to 10 minutes, while maintaining the reaction temperature at between 60 to 70° C, followed by the addition of 15 parts of 1-methyl-2-pyrrolidinone. The reactants were stirred for about ½ hour at about 60° C.

3.17 parts of triethylamine were added to the flask followed by 125 parts of deionized water heated to the reaction temperature (60° C) to form the dispersion. 0.987 parts of 2-methylpentamethylenediamine were added to the dispersion. The dispersion was stirred at 60° C. for about 2 hours.

A polyurethane dispersion of 25% solids was obtained.

Examples 5-7:

The following examples illustrate the synthesis methods utilizing both extenders, E(Y) and E(Z).

Example 5

4.37 parts of dimethylol propionic acid, 32.60 parts of a hexanediol-mixed acid polyester diol (molecular weight 2,000), Ruco Chemical S-1019, 0.74 parts of 1,4-butanediol, 0.018 parts of dibutyltindilaurate and 10 parts of 1-methyl-2-pyrrolidinone were charged into a flask equipped with a stirrer and a thermometer, under dry nitrogen cover. The temperature of the flask was maintained at about 60° C.

11.36 parts of an 80:20 mixture of 2,4- and 2,6- toluene diisocyanate (TDI) were added dropwise into the flask over a period of 5 to 10 minutes, while maintaining the reaction temperature at between 60 and 70° C., followed by the addition of 15 parts 1-methyl-2-pyrrolidinone. The reactants were stirred for about one-half hour at about 60° C.

3.11 parts of triethylamine were added to the flask followed by 125 parts of deionized water which was heated to the reaction temperature (60.C) to form the dispersion. 0.946 parts of 2-methyl pentamethylene diamine were added to the dispersion. The dispersion was stirred at 60° C for about 2 hours.

A polyurethane dispersion of 22% solids was obtained.

Example 6

4.19 parts of dimethylol propionic acid, 31.25 parts of a hexanediol-mixed acid polyester diol (molecular weight 2,000), Ruco Chemicals S-1019, 0.015 parts of dibutyltindilaurate and 10 parts of 1-methyl-2-pyrrolidinone were charged into a flask equipped with a stirrer and a thermometer, under dry nitrogen cover. The temperature of the flask was maintained at about 60° C.

12.25 parts of an 80:20 mixture of 2,4- and 2,6- toluene diisocyanate (TDI) were added dropwise into the flask over a period of 5 to 10 minutes, while maintaining the reaction temperature at between 60 and 70 C, followed by the addition of 15 parts 1-methyl-2-pyrrolidinone. The reactants were stirred for about 1 ½ hours at about 60° C.

1.41 parts of 1,4-butanediol and 3.12 parts of triethylamine were added to the flask, followed by 125 parts of deionized water which was heated to the reaction temperature (60° C.) to form the dispersion. 0.907 parts of 2-methyl pentamethylene diamine was added to the dispersion. The dispersion was stirred at 60° C. for about 2 hours.

A polyurethane dispersion of 25% solids was obtained.

Example 7

4.01 parts of dimethylol propionic acid, 29.89 parts of a hexanediol-mixed acid polyester diol (molecular weight 2,000), Ruco Chemicals S-1019, 0.016 parts of dibutyltindilaurate and 10 parts of 1-methyl-2-pyrrolidinone were charged into a flask equipped with a stirrer and a thermometer, under dry nitrogen cover. The temperature of the flask was maintained at about 60.C.

13.02 parts of an 80:20 mixture of 2,4- and 2,6- toluene diisocyanate (TDI) were added dropwise into the flask over a period of 5 to 10 minutes, while, maintaining the reaction temperature at between 60 and 70.C, followed by the addition of 15 parts 1-methyl-2-pyrrolidinone. The reactants were stirred for about one hour at about 60° C.

1.35 parts of 1,4- butanediol and 3.01 parts of triethylamine were added to the flask followed by 125 parts of deionized water which was heated to the reaction temperature (60° C.) to form the dispersion. 1.736 parts of 2-methyl pentamethylene diamine were added to the dispersion. The dispersion was stirred at 60° C. for about 2 hours.

A polyurethane dispersion of 25% solids was obtained.

Example 8

3.99 parts of dimethylol propionic acid, 29.78 parts of a caprolactone based diol (molecular weight 2,000), Union Carbide Tone 240, 0.012 parts of dibutyltindilaurate and 10 parts of 1-methyl-2-pyrrolidinone were charged into a flask equipped with a stirrer and a thermometer, under dry nitrogen cover. The temperature of the flask was maintained at about 60° C.

12.96 parts of an 80:20 mixture of 2,4 and 2,6- toluene diisocyanate (TDI) were added dropwise into the flask over a period of 5 to 10 minutes, while maintaining the reaction temperature at between 60 and 70° C., followed by the addition of 15 parts 1-methyl-2-pyrrolidinone. The reactants were stirred for about ½ hour at about 60° C.

1.55 parts of 1,5-pentanediol was added to the flask followed by 2.99 parts of triethylamine. 150 parts of deionized water which was heated to the reaction temperature (60° C.) were added to the flask to form the dispersion. 1.73 parts of 2-methyl pentamethylene diamine were added to the dispersion. The dispersion was stirred at 60° C. for about 2 hours.

A polyurethane dispersion of 22% solids was obtained.

Examples 9–10

The following examples illustrate the synthesis method which include aliphatic isocyanates.

Example 9

11.17 parts of dimethylol propionic acid, 83.42 parts of a hexanediol-mixed acid polyester diol (molecular weight 2,000), Ruco Chemicals S-1019, 0.04 parts of dibutyltindilaurate and 10 parts of 1-methyl-2-pyrrolidinone were charged into a flask equipped with a stirrer and a thermometer, under dry nitrogen cover. The temperature of the flask was maintained at about 70° C.

49.29 parts of dicyclohexamethylene-4,4'-diisocyanate were added dropwise into the flask followed by 10 parts of 1-methyl-2-pyrrolidinone. The reactants were stirred for about 1½ hours at about 70° C.

3.76 parts of 1,4-butanediol were added to the flask and stirred for 10 minutes and 8.37 parts of triethylamine were added to the flask and stirred for 5 minutes. 125 parts of deionized water at room temperature (about 25° C) were added to the flask to form the dispersion. 2.394 parts of 2-methyl pentamethylene diamine were added to the dispersion. The dispersion was stirred at 70° C. for about 2 hours.

A polyurethane dispersion of 48% solids with a viscosity of 50 cps was obtained.

Example 10

10.62 parts of dimethylol propionic acid, 79.16 parts of a hexanediol-mixed acid polyester diol (molecular weight 2,000), Ruco Chemicals S-1019, 0.03 parts of dibutyltindilaurate and 15 parts of 1-methyl-2-pyrrolidinone were charged into a flask equipped with a stirrer and a thermometer, under dry nitrogen cover. The temperature of the flask was maintained at about 70° C.

51.93 parts of dicyclohexamethylene-4,4'-diisocyanate were added dropwise into the flask followed by 10 parts of 1-methyl-2-pyrrolidinone. The reactants were stirred for about 1½ hours at about 70° C.

3.57 parts of 1,4-butanediol were added to the flask and stirred for 10 minutes and 7.77 parts of triethylamine was added to the flask and stirred for 5 minutes. 150 parts of deionized water at room temperature (about 25° C.) were added to the flask to form the dispersion. 4.58 parts of 2-methyl pentamethylene diamine were added to the dispersion. The dispersion was stirred at 70.C for about 2 hours.

A polyurethane dispersion of 33% solids with a viscosity of 20 cps was obtained.

Previous examples described the synthesis of polyurethane dispersions with the extender E(Y) in stoichiometric amount with the free isocyanate groups.

Examples 11-12

The following examples illustrate the synthesis method using amounts of extender E(Y) which are less than the stoichiometric amount required.

Example 11

12.02 parts of dimethylol propionic acid, 89.66 parts of hexanediol-mixed acid polyester diol (molecular weight 2,000), Ruco Chemicals S-1019, and 25 parts of 1-methyl-2pyrrolidinone were charged into a flask equipped with a stirrer and a thermometer, under dry nitrogen cover. The temperature of the flask was maintained at about 50° C.

39.08 parts of an 80:20 mixture of 2,4- and 2,6- toluene diisocyanate (TDI) were added dropwise into the flask over a period of 5 to 10 minutes, while maintaining the reaction temperature at between 50 and 60° C., followed by the addition of 25 parts 1-methyl-2-pyrrolidinone. The reactants were stirred for about one and a half hours at about 50° C.

4.04 parts of 1,4-butanediol and 9.02 parts of triethylamine were added to the flask, followed by 250 parts of deionized water at room temperature to form the dispersion. 2.55 parts of 2-methyl pentamethylene diamine dissolved in 50 parts of deionized water at room temperature were added to the dispersion. The dispersion was stirred at 50° C. for about 2 hours.

A polyurethane dispersion of 33% solids with a viscosity of 60 cps was obtained.

Example 12

12.56 parts of dimethylol propionic acid, 93.78 parts of hexanediol-mixed acid polyester diol (molecular weight 2,000), Ruco Chemicals S-1019, and 25 parts of 1-methyl-2pyrrolidinone were charged into a flask equipped with a stirrer and a thermometer, under dry nitrogen cover. The temperature of the flask was maintained at about 50° C.

36.74 parts of an 80:20 mixture of 2,4- and 2,6- toluene diisocyanate (TDI) were added dropwise into the flask over a period of 5 to 10 minutes, while maintaining the reaction temperature at between 50 and 60° C., followed by the addition of 10 parts 1-methyl-2-pyrrolidinone. The reactants were stirred for about one and a half hours at about 50° C.

4.22 parts of 1,4-butanediol were added to the flask and stirred for 5 minutes. 8.56 parts of triethylamine dissolved in 100 parts of deionized water at room temperature were added to the flask to form the dispersion. 1.38 parts of 2-methyl pentamethylene diamine mixed with 75 parts of room temperature deionized water were added to the dispersion. The dispersion was stirred at 50° C. for about 2 hours.

A polyurethane dispersion of 42% solids with a viscosity of 420 cps was obtained.

Example 13

The following example illustrates the synthesis method with an amount of extender E(Y) below the stoichiometric amount required, with a defoamer and dispersion/extension in one step.

12.02 parts of dimethylol propionic acid, 89.65 parts of hexanediol-mixed acid polyester diol (molecular weight 2,000) Ruco Chemicals S-1019, and 25 parts of 1-methyl-2-pyrrolidinone were charged into a flask equipped with a stirrer and a thermometer, under dry nitrogen cover. The temperature of the flask was maintained at about 50° C.

39.05 parts of an 80:20 mixture of 2,4- and 2,6- toluene diisocyante (TDI) were added dropwise into the flask over a period of 5 to 10 minutes, while maintaining the reaction temperature at between 50 to 60° C, followed by 10 parts of 1-methyl-2-pyrrolidinone. The reactants were stirred for about one and a half hours at about 50° C.

4.04 parts of 1,4-butanediol, 1.01 parts of DeeFo defoamer and 5 parts of 1-methyl-2-pyrrolidinone were added to the flask and stirred for 10 minutes. 8.23 parts of triethylamine and 1.35 parts of 2-methyl pentamethylene diamine were dissolved in 200 parts of deionized water and added to the reactor. The dispersion was stirred at about 50° C. for about 2 hrs.

A polyurethane emulsion of 38% solids with a viscosity of 1300 cps was obtained.

Example 14

The following tests show that the polyurethane dispersions prepared by this invention, with the proper combination of components, have good adhesive properties.

These polyurethane dispersions of Examples 1-13 were coated on rigid substrates, such as ABS, plastics, fiber-board and the like, and air-dried at room temperature. An expandable vinyl was heated beyond its softening point, then placed over the adhesive coated surface and laminated to the polyurethane coated substrates using thermoforming (vacuum) techniques. Adhesive properties of the polyurethanes were studied by conducting peel tests on the panels prepared. The peel values of the polyurethane dispersions discussed in the examples shown in the dispersion synthesis section, are given below in Table 1. Peel tests were conducted at room temperature according to ASTM D-413 at a rate of two inches per minute. All adhesive property studies discussed in these examples were done on panels prepared by thermoforming Naugafoam 6A vinyl onto Royalite R-20 ABS plastic coated with polyurethane dispersion. Test panels were conditioned for 24 hours at room temperature before testing and before any other exposure condition(s), unless specified otherwise.

TABLE 1

| Peel Strength of Laminates Made with Various Polyurethane Dispersions | |
|---|---|
| Polyurethane Dispersion Of Example | Average Peel Value (lb./in.) |
| 1 | 2.1 |
| 2 | 7.9 |
| 3 | 16.1 |
| 4 | 8.9 |
| 5 | 18.5 |
| 6 | 19.1 |
| 7 | 12.2 |
| 8 | 16.1 |
| 9 | 13.9 |
| 10 | 6.0 |
| 11 | 15.4 |
| 12 | 13.0 |
| 13 | 12.7 |

Example 15

These tests illustrate that for adhesive applications where high temperature and/or high relative humidity resistance are required, the polyurethane could be crosslinked to build more tolerance to such adverse conditions.

These polyurethanes are crosslinked with multi-functional compounds containing reactive groups that can react with the polymer. The crosslinking reaction may take place during the drying process or more preferably, with the application of heat, from the hot vinyl during the lamination process. The reaction could lead to a crosslinked polymer which shows better adhesive properties even after high temperature and/or humidity aging. The multi-functional crosslinking agent may be a water dispersible polyisocyanate, as disclosed in U.S. Pat. Nos. 4,762,880 and 4,853,061. Adhesive properties of a polyurethane dispersion with and without the use of a multi-functional compound are given below in Table 2. The polyurethane dispersion used here is of the type described in the Example 6, and the multi-functional component is a water dispersible hexamethylene polyisocyanate, such as those under the tradename of Desmodur KA 8365 from Mobay.

TABLE 2

Peel Strength of Laminates Made with Polyurethane Polymer and Crosslinked Polymer

| | Ave. Peel Value (lb./in.) | |
|---|---|---|
| Condition | Polymer Only | Crosslinked Polymer |
| Room Temp./24 Hours | 10.1 (AF) | 25.0 (VT) |
| 100° F./100% H/100 Hours | 9.0 (AF) | 15.3 (AF) |
| 158° F./3 Days | 13.0 (AF) | 20.2 (VT) |
| 158°/7 Days | 10.3 (AF) | 19.2 (VT) |

NOTE:
VT = Vinyl Tear.
AF = Adhesive Failure

Example 16

The formulations of this example given below illustrate that polyurethane dispersions prepared by this invention can be formulated with other compounds to obtain the required dispersion properties for a particular application.

One or more thickeners can be used to adjust the viscosity of the dispersion, but they should be those that will not react or affect the polymer or the adhesive properties, or ones that will react with the multi-functional crosslinking agents. Pigments may be used, provided that they too have non-interfering, non-reacting chemical properties.

Listed below are some thickeners used for the formulation and the viscosity properties of the final formulated dispersions. The polyurethane dispersion used here is the type described in Example 6. The initial dispersion viscosity was 150 cps and the amounts (parts) of thickener used for the formulation is per 100 parts of the polyurethane dispersion.

| Thickener | Parts of Thickener | Dispersion Viscosity (cps) |
|---|---|---|
| TT-678 (Rohm and Haas) | 1.22 | 1500 |
| Acrysol GS (Rohm and Haas) | 3.29 | 2000 |
| 76 Res 6038 (Unocal) | 2.64 | 2000 |
| SCT-100 (Union Carbide) | 1.25 | 2025 |
| SCT-200 (Union Carbide) | 4.18 | 2000 |

Table 3 shows the effect of open time on adhesive properties of a polyurethane dispersion of the type described in Example 6, formulated with different thickeners or pigments and a crosslinking agent. The dispersion viscosity was 150 cps and the thickeners were used to obtain dispersion of viscosities of about 2000 cps. The amounts (parts) of thickener used were based on 100 parts of the dispersion. The crosslinking agent used was a water dispersible hexamethylene polyisocyanate, Desmodur KA 8365 from Mobay, at a level of 5 parts per 100 parts of the formulated dispersion.

TABLE 3

Effects of Open Time on Peel Strength of Different Thickeners and Pigments with a Polyurethane Dispersion

| Material | Parts | Open Time | Peel Strength (lb./in) |
|---|---|---|---|
| Thickener | | | |
| SCT-200 | 1.25 | 1 hr 40 min. | 19.2 (AF) |
| | | 4 hr 15 min. | 13.0 (AF) |
| Acrysol GS | 3.29 | 1 hr 40 min. | 17.5 (AF) |
| | | 4 hr 15 min. | 9.7 (AF) |
| Pigment | | | |
| Lithium Red | 0.29 | 1 hr 40 min. | 16.2 (AF) |
| | | 4 hr 15 min. | 10.2 (AF) |
| Flexiverse Black | 0.30 | 1 hr 40 min. | 12.2 (AF) |
| | | 4 hr 15 min. | 7.7 (AF) |

NOTE:
AF - Adhesive Failure

Examples 17–19

Different polyurethane dispersions were formulated with a thickener (SCT-100), pigment (Flexiverse Black) and reactive multi-functional crosslinking agent, such as a water-dispersible polyisocyanate (Desmodur KA 8365). The thickener, SCT-100, was used to obtain dispersions with viscosities of about 2,000 cps, and the thickener levels (parts) used in the formulations depended on the initial viscosities of the polyurethane dispersions used. The pigment Lithium Red was used in Examples 17 and 18, and pigment Flexiverse Black was used in Example 19. The pigment levels used were about 0.30 parts per 100 parts of the dispersion. The crosslinker, Desmodur KA 8365, was used at a level of 5 parts per 100 parts of the dispersion in all the formulations. The effects o the pot life and open time of these reactive systems on peel strength are given in Table 4.

TABLE 4

Effects of Open time and Pot Life on Peel Strengths of Various Formulated Dispersions
Average Peel Value (lb./in.)

| Open Time | Example 17 | Open Time | Example 18 | Open Time | Example 19 |
|---|---|---|---|---|---|
| 1 Hour | 21.7(VT) | 1 Hour | 21.2(VT) | 2 Hours | 21.2(VT) |
| 3 Hours | 14.2(AF) | 3 Hours | 22.2(VT) | 3.5 Hours | 20.5(VT) |
| 5 Hours | 9.7(AF) | 5 Hours | 18.7(VT) | 6 Hours | 21.0(AF) |
| 6 Hours | 8.7(AF) | 6 Hours | 19.5(VT) | 8 Hours | 20.5(AF) |

TABLE 4-continued

Effects of Open time and Pot Life on Peel
Strengths of Various Formulated Dispersions
Average Peel Value (lb./in.)

| Pot Life | | Pot Life | | Pot Life | |
|---|---|---|---|---|---|
| 1 Hour | 18.7(VT) | 1 Hour | 20.7(VT) | 2 Hours | 23.7(VT) |
| 3.5 Hours | 22.2(VT) | 3.5 Hours | 20.7(VT) | 3.5 Hours | 24.2(VT) |
| 5.5 Hours | 16.5(VT) | 5.5 Hours | 22.5(VT) | 6 Hours | 20.0(VT) |
| 6.5 Hours | 16.5(VT) | 6.5 Hours | 23.5(VT) | 8 Hours | 23.7(VT) |

NOTE:
VT = Vinyl Tear.
AF = Adhesive Failure

Example 17 is a formulated dispersion of the type described in Example 6.

Example 18 is a formulated dispersion of the type described in Example 11.

Example 19 is a formulated dispersion of the type described in Example 12.

It is to be understood that the foregoing examples of synthesis of polyurethane dispersions and adhesive properties thereof are given for the purpose of illustration only. Any other suitable polyisocyanate(s), active hydrogen containing compound(s), salt-forming component(s), polyol(s), solvent(s), polyamine(s) or similar compounds could be used, provided that the synthesis methods disclosed herein are followed.

What is claimed is:

1. A water dispersible polyurethane composition comprising: an organic isocyanate compound; an active hydrogen containing organic compound having an ionized or easily ionizable group; a crystalline oligomeric or polymeric polyol; first and second extenders; and a base; wherein the organic isocyanate compound is initially reacted with sufficient amounts of the active hydrogen containing organic compound and polyol to form an isocyanate terminated prepolymer, which prepolymer is reacted with the extenders for increasing the molecular weight of the prepolymer and then treated with the base.

2. The composition of claim 1 wherein the organic isocyanate compound is a polyisocyanate and the polyol is a polyester or caprolactone based polyol.

3. The composition of claim 1 wherein the polyol is linear and has a molecular weight of between about 300 and 5000.

4. The composition of claim 3 wherein the polyol is a hexane diol mixed acid polyester diol or a caprolactone based polyester diol.

5. The composition of claim 1 wherein the first extender is a diamine and is present in an amount sufficient to form a linear isocyanate prepolymer.

6. The composition of claim 1 wherein said second extender is a diol having a molecular weight of between about 62 and 500.

7. The composition of claim 6 wherein the molecular weight of the seconder diol is between about 90 and 200.

8. The composition of claim 1 wherein the easily ionizable group is a carboxyl acid moiety; and the base is an amine.

9. A water dispersible polyurethane composition comprising: a polyisocyanate; an organic compound containing at least two active hydrogens and at least one carboxyl group; a crystalline oligomeric or polymeric polyol; a first extender of a diamine; a second extender of a diol; and a base of an amine, wherein the polyisocyanate is initially reacted with organic compound and polyol to form an isocyanate terminated prepolymer, which prepolymer is then treated with the base to neutralize the carboxyl group, followed by reaction of the prepolymer with the first and second extenders to increase the molecular weight of the prepolymer and form the polyurethane composition.

10. The composition of claim 9 wherein the first exender is added in an amount which is stoichiometrically equal or less than that of the available isocyanate groups present in the prepolymer.

11. The composition of claim 9 wherein the polyol is a polymeric diol which exhibits semi-, partial- or full-crystallinity, has a melting temperature or a melting temperature range of between about 30 to 100° C., and has a moderate to fast crystallization rate.

12. The composition of claim 11 wherein the polyol is a polyester or caprolactone based polyol having a molecular weight of between about 300 and 5000.

13. The composition of claim 12 wherein the polyol is a hexane diol mixed acid polyester diol or a caprolactone based polyester diol.

14. The composition of claim 9 wherein the second extender forms an amorphous and highly structured region in the isocyanate terminated prepolymer, which structured region exhibits a distinct melting temperature or a melting temperature range.

15. The composition of claim 9 wherein the first extender is a branched, aliphatic diamine having a primary amine group at each end of the molecule.

16. The composition of claim 9 having a melting temperature or a transition temperature comparable to a melting temperature in the range of from about 30 to 100° C.

17. The composition of claim 9 having a melting temperature in the range of from about 30 to 100° C. and a glass transition temperature of from about −50 to −10° C.

18. A process for the preparation of a polyurethane dispersion which comprises: forming a linear, isocyanate-terminated prepolymer by reacting a polyisocyanate with a crystalline oligomeric or polymeric polyol, an organic compound containing at least two active hydrogen atoms and an ionized or easily ionizable group; adding first and second extenders to the prepolymer to increase its molecular weight; and placing the prepolymer in water in the presence of base to form a polyurethane dispersion.

19. The process of claim 18 wherein the first extender is added to the dispersion for reaction with the prepolymer.

20. The process of claim 18 wherein the first extender is added in an amount less than the stoichiometric amount based on the available isocyanate groups present in the prepolymer.

21. The process of claim 18 which further comprises forming the polyurethane dispersion with particle sizes in the range of 0.01 micron to 1 micron.

22. The process of claim 18 wherein the first extender is added in an amount which approximates the stoichiometric amount based on the available isocyanate groups present in the prepolymer.

23. The process of claim 18 which further comprises heating the water to up to about 90° C. prior to placing the prepolymer therein.

24. The process of claim 18 wherein the polyol is a polyester or caprolactone based polyol.

25. The polyurethane dispersion produced by the method of claim 18.

26. An adhesive comprising the polyurethane dispersion of claim 25.

27. The adhesive of claim 26 which further comprises a nonreactive component.

28. The adhesive of claim 26 which further comprises a multifunctional reactive compound to form a cross-linked polymer requiring high heat and/or humidity resistance.

29. An adhesive comprising the polyurethane dispersion of claim 1.

30. The adhesive of claim 29 which further comprises a non-reactive component.

31. The adhesive of claim 29 which further comprises a multifunctional reactive compound to form a cross-linked polymer requiring high heat and/or humidity resistance.

32. The adhesive of claim 30 which further comprises a multifunctional reactive compound to form a cross-linked polymer requiring high heat and/or humidity resistance.

33. A method of joining an expandable and a non-expandable component which comprises:

applying to the non-expandable component, the adhesive composition of claim 25 having a sufficient solids content to enable the resultant polyurethane to join and hold said components together;

drying the applied adhesive composition to remove water; and joining the expandable component to the surface coated with the dried adhesive by a thermoforming lamination process.

34. The method of claim 33 wherein the drying is performed at ambient temperature.

35. The method of claim 33 wherein the drying is performed at an elevated temperature.

36. The method of claim 33 wherein the drying is performed in an oven at 100° C.

37. The method of claim 33 which further comprises edgefolding the expandable component during the thermoforming lamination process.

* * * * *